United States Patent
Bruno et al.

(10) Patent No.: US 9,557,824 B2
(45) Date of Patent: Jan. 31, 2017

(54) COMPUTER KEYBOARD WITH ULTRASONIC USER PROXIMITY SENSOR

(76) Inventors: Philip J. Bruno, Oakland, CA (US); Robert A. D. Schwartz, Oakland, CA (US); Paul Schwartz, Oakland, CA (US)

( * ) Notice: Subject to any disclaimer, the term of this patent is extended or adjusted under 35 U.S.C. 154(b) by 1190 days.

(21) Appl. No.: 13/136,358

(22) Filed: Jul. 28, 2011

(65) Prior Publication Data

US 2012/0030752 A1    Feb. 2, 2012

Related U.S. Application Data

(60) Provisional application No. 61/369,301, filed on Jul. 30, 2010.

(51) Int. Cl.
| | |
|---|---|
| G06F 3/02 | (2006.01) |
| G06F 1/32 | (2006.01) |
| G06F 21/32 | (2013.01) |
| G06F 21/35 | (2013.01) |
| G06F 21/83 | (2013.01) |
| H04L 9/32 | (2006.01) |

(52) U.S. Cl.
CPC ............ *G06F 3/021* (2013.01); *G06F 1/3231* (2013.01); *G06F 3/0219* (2013.01); *G06F 21/32* (2013.01); *G06F 21/35* (2013.01); *G06F 21/83* (2013.01); *H04L 9/3231* (2013.01); *H04L 2209/805* (2013.01); *Y02B 60/1289* (2013.01)

(58) Field of Classification Search
CPC ........ G06F 1/3231; G06F 3/021; G06F 21/32; H04L 9/3231

USPC . 713/168–174, 182–186, 202; 709/168–174, 182–186, 202; 726/2–21

See application file for complete search history.

(56) References Cited

U.S. PATENT DOCUMENTS

| | | | |
|---|---|---|---|
| 6,002,427 A | 12/1999 | Kipust | |
| 6,282,655 B1* | 8/2001 | Given | G06F 1/3215 340/540 |
| 6,374,145 B1 | 4/2002 | Lignoul | |
| 7,346,933 B2 | 3/2008 | Gliniecki | |
| 7,710,407 B2 | 5/2010 | Trent | |
| 2003/0046588 A1* | 3/2003 | Gliniecki | G06F 21/35 726/4 |
| 2003/0159053 A1* | 8/2003 | Fauble | G06F 21/83 713/189 |
| 2008/0167537 A1* | 7/2008 | Teller | A61B 5/01 600/301 |
| 2011/0185408 A1* | 7/2011 | Travis | G06F 21/32 726/6 |
| 2013/0013925 A1* | 1/2013 | Buer | H04L 9/3234 713/168 |

* cited by examiner

*Primary Examiner* — Evans Desrosiers
(74) *Attorney, Agent, or Firm* — Howard Cohen

(57) ABSTRACT

A terminal for a computer system includes a keyboard incorporating modules for performing two factor authentication (TFA) for log-on of a user. TFA preferably combines a fingerprint scan with the proximity of a previously enrolled Bluetooth device that typically accompanies the user, such as a wireless phone or headset. The keyboard also includes an ultrasonic proximity detector aimed to detect the presence of the user at the keyboard and to terminate log-on when the user leaves the keyboard. The keyboard processor may be used as an encryption engine to encode all keystroke data and authentication/log-on transactions with the computer system.

13 Claims, 3 Drawing Sheets

FIG. 1
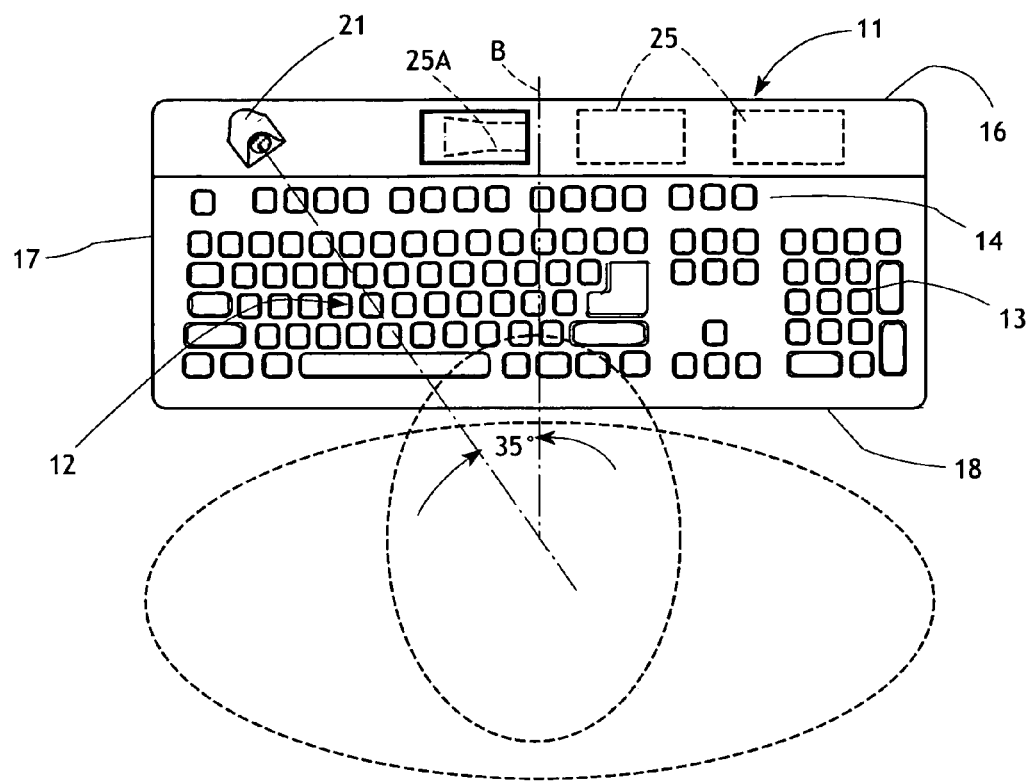
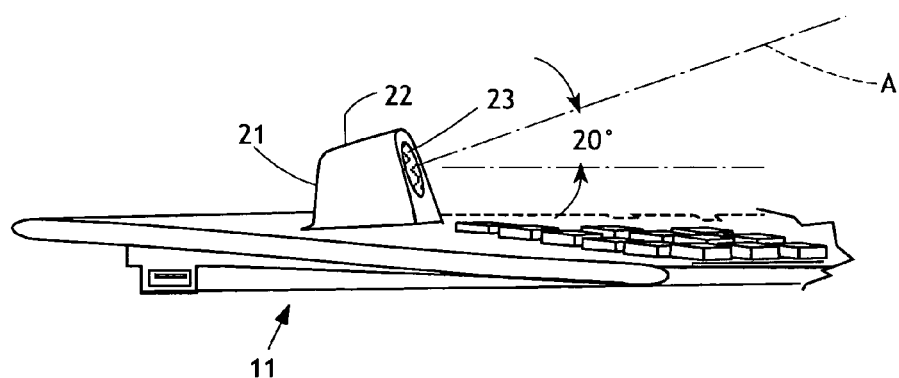
FIG. 2

COMPUTER KEYBOARD WITH ULTRASONIC USER PROXIMITY SENSOR

CROSS-REFERENCE TO RELATED APPLICATIONS

This application claims the benefit of filing date priority based on Provision Application No. 61/369,301, filed Jul. 30, 2010.

FEDERALLY SPONSORED RESEARCH

Not applicable.

SEQUENCE LISTING, ETC ON CD

Not applicable.

BACKGROUND OF THE INVENTION

Field of the Invention

This invention relates to computer systems having at least one terminal that requires user authentication and provides secure access to the system and includes an ultrasonic proximity sensor that logs out of the user's account on the terminal when the user leaves the vicinity of the terminal.

Description of Related Art

It has been recognized in the prior art that secure computer systems are often protected through the use of passwords, biometric identification, ID cards, and the like, to enable access to accounts or data that are stored in or linked to the computer system. These measures generally are effective in reducing break-ins to a computer system to a tolerable minimum.

Today the typical authentication is with what is called Two Factor Authentication (TFA). For the most part these two factors are a username and a password. There are several other TFA methods currently available in the market and these range from username and fingerprint to electronic identification cards (Xyloc et. al.) and to One Time Password (OTP) products such as Arcot and RSA tokens. Each of these authentication schemes has its advantages and disadvantages as described below.

Username and passwords have been the standard authentication scheme since (practically) the dawn of the computer age. Unfortunately, this scheme has two disadvantages. First, because usernames and passwords are so common, hackers have devised many techniques to attack them and gain access to secure systems. Secondly, because of the vulnerability of usernames and passwords many system administrators require passwords that are so random they are difficult to remember and because of that they are often forgotten. This requires the expense of changing them, or the user will write down the password, a record that can easily be stolen. One often sees usernames and passwords written on "Post-It" notes and adhered to the monitor of the user's computer. This is a severe security problem!

OTP tokens are very secure, but they are inconvenient. The user must, in the case of RSA, carry a token generating device or, as in the case of Arcot, have an application running on a device such as a cell phone. In both cases a cumbersome procedure is required by the user to log on. The RSA token device has the disadvantage of being stealable, allowing a nefarious user access to secure data, or it can be lost and a replacement cost incurred. A similar disadvantage exists for soft token providers: if the device is stolen or copied and the user's pin number is known, a hacker can impersonate that user and access the system. The user also has the inconvenience of having to remember their username.

Electronic cards are a good authentication method, but they are expensive and can be lost, stolen or cloned. These cards are usually used with a second factor such as a password or a fingerprint, but the replacement cost for these cards is high and there is the overhead of issuing and retrieving the cards as users come and go, which can also cause some expense and nuisance.

Usernames and fingerprint data are a good alternative to the above authentication schemes, but have the disadvantage that the username must be remembered. Fingerprint data is usually stored in an encrypted template file and not as an image, giving increased security. The fingerprint template generation requires the user to be physically present at log-on, as most modern fingerprint readers are resistant to attacks such as plastic casts of a fingerprint and non-living tissue as a result of physically dismembering the user's finger.

In addition, one common path for data to be stolen from a computer system involves the authorized user and his/her presence at the terminal at which authorized access has been granted. ("Terminal" is a general reference that includes desktop computers, workstations, or any similar system that employs a keyboard and requires user authentication.) It is not uncommon for individuals to temporarily leave the vicinity of the terminal for any one of a number of legitimate reasons, often without logging out of the authorized access state. As a result, the terminal is an open window into the secure system, and any nearby individual may glance at the screen, or may commandeer the terminal by using the keyboard to access data, enter data, or erase data. Thus it is clear that the log-out process is as important as the secure log-in process, but it is an aspect of computer security that in not given sufficient attention.

In U.S. Pat. No. 7,346,933 there is disclosed an ultrasonic proximity sensor that is connected to a secure computer system terminal so that the system may determine when an authorized computer user leaves the vicinity of the terminal. Upon detecting that the user has departed, the system immediately (or after a short time delay) logs out of the authorized state, so that casual snooping as well as determined hacking cannot take place. Although the patent describes an effective concept for preventing unauthorized computer access, it is notably lacking in describing any physical embodiment of the concept that may be practically useful. The only commercially available embodiment of the concept is a sensor module provided with a bracket for mounting on the upper edge surface of a computer monitor. This product is too large and too heavy to be realistic, and it does not protect the computer component that is most vital to data theft: the computer keyboard. Thus there is a deficiency in the prior art that deserves to be rectified.

BRIEF SUMMARY OF THE INVENTION

The present invention generally comprises a system for authenticating a computer terminal user's ID and presence, so that unauthorized use of the terminal is prevented from occurring. In one aspect, the invention provides a log-in authentication scheme that is intended to prevent unauthorized use of a computer terminal. This authentication scheme is based on the presentation of two disparate factors: a fingerprint scan and the proximity of a Bluetooth device that has been paired with the fingerprint scan. Bluetooth is a standard radio communication protocol commonly used by many electronic devices such as cell phones, wireless headsets, MP3 players, iPads etc. These devices are recognized by a Bluetooth receiver in either the computer, as is the case with most laptops, or as a peripheral device either attached to the computer or embedded in another device such as a keyboard. The methodology of the recognition is that each Bluetooth device emits a radio signal with its serial number embedded within it and this number is retrieved by the receiver. Each Bluetooth devices serial number is unique and is installed in the device at the time of its manufacture and is difficult or impossible to change. When the device comes into the range of the receiver it is recognized and attached if the user has already paired the device with the computer or, if not paired it is simply noted to exist.

The system works as follows: when the user registers with the system they bring with them any Bluetooth enabled device that they are likely to be carrying such as a cell phone, MP3 player, headset etc. At the same time master fingerprint templates are collected from the user. The Bluetooth devices serial numbers are collected and associated with the users fingerprint template in the authentication database.

All log-ons require two factors, making the system very secure. A hacker would have to discover the user's Bluetooth device serial number, generate a device to broadcast the serial number and somehow also capture that same users fingerprint template. If the database containing the information can be kept secure then the system would be difficult to hack into.

When the user attempts to log in to the system, the user approaches the computer or terminal of their choosing. The computer, using its embedded Bluetooth receiver, scans and becomes aware of the Bluetooth device the user is carrying and discovers its serial number. The user places a finger on the fingerprint reader. The computer, using the fingerprint device use as a prompt, gathers all the serial numbers of every Bluetooth device within range, bundles the serial numbers and fingerprint data together and sends it to the authorization server. The server queries the data to determine if the fingerprint data is associated with any of the acquired serial numbers. If so, the user is authorized and if not the user is rejected.

This arrangement has several salient advantages. The user has nothing to remember, except to bring with them a registered device. Also, the log-on procedure is very convenient. The user simply places their finger on the fingerprint reader and is either accepted, or rejected. There are no radio cards, token generating devices, software downloads and configurations required. All that is required is that the user be in possession of at least one of the Bluetooth devices that was previously registered by the system (most probably a cell phone) and a previously enrolled fingerprint scan. There are no token generating devices to buy and keep track of. Likewise, there are no third party software applications to keep up to date, and port to new devices as they become available.

In another aspect the system addresses the prior art problem caused by users leaving the vicinity of their computer terminal when it is logged in to the secure system, creating an open window for any casual or malevolent individual. It includes a computer keyboard that incorporates a "User Presence Detector" (UPD) device. This UPD device is used in combination with either a biometric fingerprint reader or a passive near field communication receiver (embedded in the keyboard) and ID card to authorize a user. The UPD constantly monitors and detects a user's presence at the keyboard so the computer will not lock until the user physically steps away. The UPD is controlled by a software utility embedded in the electronics of the UPD that allows the minimum and maximum proximity distance range to be adjustable for optimum use. The sensitivity to the size and mass is also adjustable.

In one preferred embodiment, the UPD comprises an ultrasonic detector that is a transceiver that emits an ultrasonic beam and detects reflected energy returned to the transceiver. The ultrasonic detector is mounted in a small protrusion formed in the upper surface of the keyboard, adjacent to the uppermost row of keys and located adjacent to one corner of the keyboard. The ultrasonic detector is aimed at an elevation angle of approximately 20°, and is directed to form an included angle of approximately 35° with an axis extending transversely to the midpoint of the keyboard. However, these angles might be adjusted to account for a variation in the beamwidth of the ultrasonic sensor.

In this way the sensor is directed toward the most-likely position of an individual using the keyboard, so that the proximity detection error rate is very low.

In a further aspect of the invention, the computer system or server runs a routine that detects the keyboard as well as the identification modules of the terminal. It identifies these components by serial number or similar unique number, and generates a lock screen command or log-off command if the detected devices do not match a list of authorized devices for this terminal. The principle reason for locking the computer screen upon keyboard removal is that the UPD device could potentially be defeated by unplugging the UPD-equipped keyboard and replacing it with a standard keyboard. This routine also prevents a break-in to the computer system through the use of substituted devices that have been rigged.

BRIEF DESCRIPTION OF THE DRAWING

FIG. 1 is a partial side perspective of the user presence detector of the keyboard of the present invention.

FIG. 2 is a plan view of the keyboard of the invention incorporating the user presence detector.

DETAILED DESCRIPTION OF THE INVENTION

Figure 3:
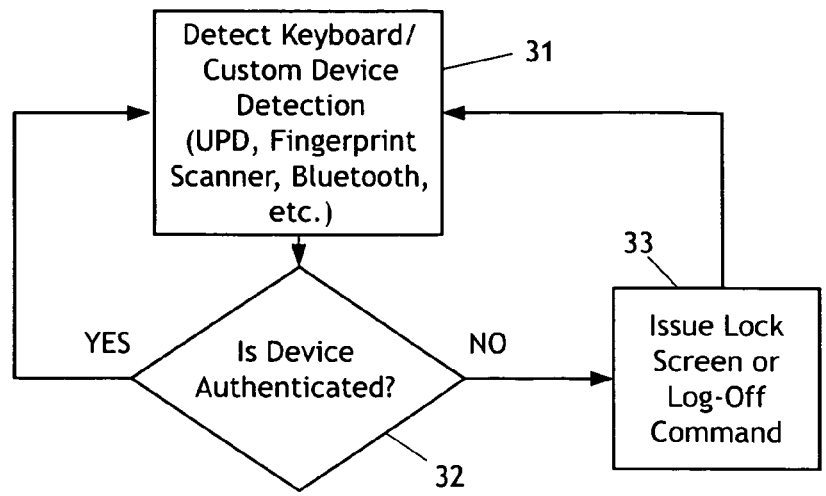
FIG. 3 is a block diagram flow chart depicting the operation of a software disconnect mechanism for locking the computer terminal when an unauthorized terminal device is detected.

The present invention generally comprises a system for not only authenticating a computer terminal user's ID before authorization and log-in, but also detecting the user's continued presence at the terminal's keyboard, so that the terminal is logged off when the user leaves the vicinity. Thus unauthorized use of the terminal is prevented from occurring.

As shown in the accompanying figures, the computer keyboard 11 has a full complement of alphanumeric keys 12, a numerical keypad 13, and a row of function keys 14 adjacent to the top edge 16 of the keyboard. This keyboard layout is typical but not necessarily limiting. The keyboard 11 also includes opposed sides 17 and a bottom edge 18.

A salient feature of the keyboard 11 is the provision of a protrusion 21 projecting upwardly from the upper surface of the keyboard. The protrusion 21 is located in an area of the keyboard that is adjacent to the corner formed by the top edge 16 and one of the sides 17. The protrusion is provided with a generally cylindrical upper surface 22 that blends into the upper surface of the keyboard with smoothly radiused filets.

The axis of symmetry A of the cylindrical upper surface is oriented to maximize the ability of the user presence detector to sense the presence of the keyboard user. The axis A is directed at an elevation angle of approximately 20° (with respect to the horizontal surface that supports the keyboard). Furthermore, the axis is directed toward the position that a typical user would occupy while using the keyboard. Thus, as shown in FIG. 2, the axis A of the protrusion forms an included angle of approximately 35° with an axis B that bisects the top and bottom edges of the keyboard 11.

The protrusion 21 supports an ultrasonic proximity detector and is generally comprised of an ultrasonic transducer 23 that emits an audio beam along the axis A of the protrusion. The beam is thus aimed to the spot most often occupied by a keyboard user, shown in phantom line in FIG. 1.

The keyboard may also be provided with built-in security devices 25, such as a fingerprint reader or other biometric or electromagnetic user authentication devices, so that a user may be verified before the system grants access through the terminal. After verification and log-in, the ultrasonic user presence detector operates continuously to assure that the user has not departed from the vicinity of the keyboard 11. Following a successful log-in to the system, as soon as user presence is no longer detected (or after a preset time delay to avoid false negative actions), the ultrasonic detector will send a signal through the same channel used by the keyboard to communicate with the computer system. The UPD signal will cause the computer system to log out of the user access mode at the terminal served by the keyboard 11, so that the opening into the system is quickly blocked before snooping or hacking can occur. The sequence of steps in this operation is detailed below.

The protrusion 21 may be located at other positions on the keyboard, such as the medial area adjacent the top edge, or at the top edge corner opposed to the one shown, as long as it is supported by the keyboard itself and is aimed at the expected position of the user at the keyboard.

As noted in the prior art cited above, other detector technologies may be used in place of the ultrasonic transceiver, such as passive infrared or infrared beam reflection, without departing from the spirit and scope of the invention.

The keyboard 11 may also be provided with a receptacle for supporting and connecting a Bluetooth transceiver device 25A to establish one factor (presence of a recognized Bluetooth device) of a TFA (two factor authentication) arrangement for validating a user log-in. The other factor may be established by one of the devices 25, such as a fingerprint scanner, RFID detector, card scanner, or the like.

With regard to FIG. 3, there is shown a flow chart of the fundamental operation of the invention. The computer keyboard 11 described previously is an important component of a computer terminal that is connectable to a system server. The routine shown in FIG. 3 is conducted by the system server, which in step 31 first detects the keyboard 11 as well as the identification modules 25 and/or 25A. In step 32 it identifies these components by serial number or similar unique number, and generates a lock screen command or log-off command if the detected devices do not match a list of authorized devices for this terminal. The principle reason for locking the computer screen upon keyboard removal is that the UPD 21 feature could potentially be defeated by unplugging the UPD-equipped keyboard and replacing it with a standard keyboard. And in general this routine prevents a break-in to the computer system through the use of substituted devices that have been rigged.

Figure 4:
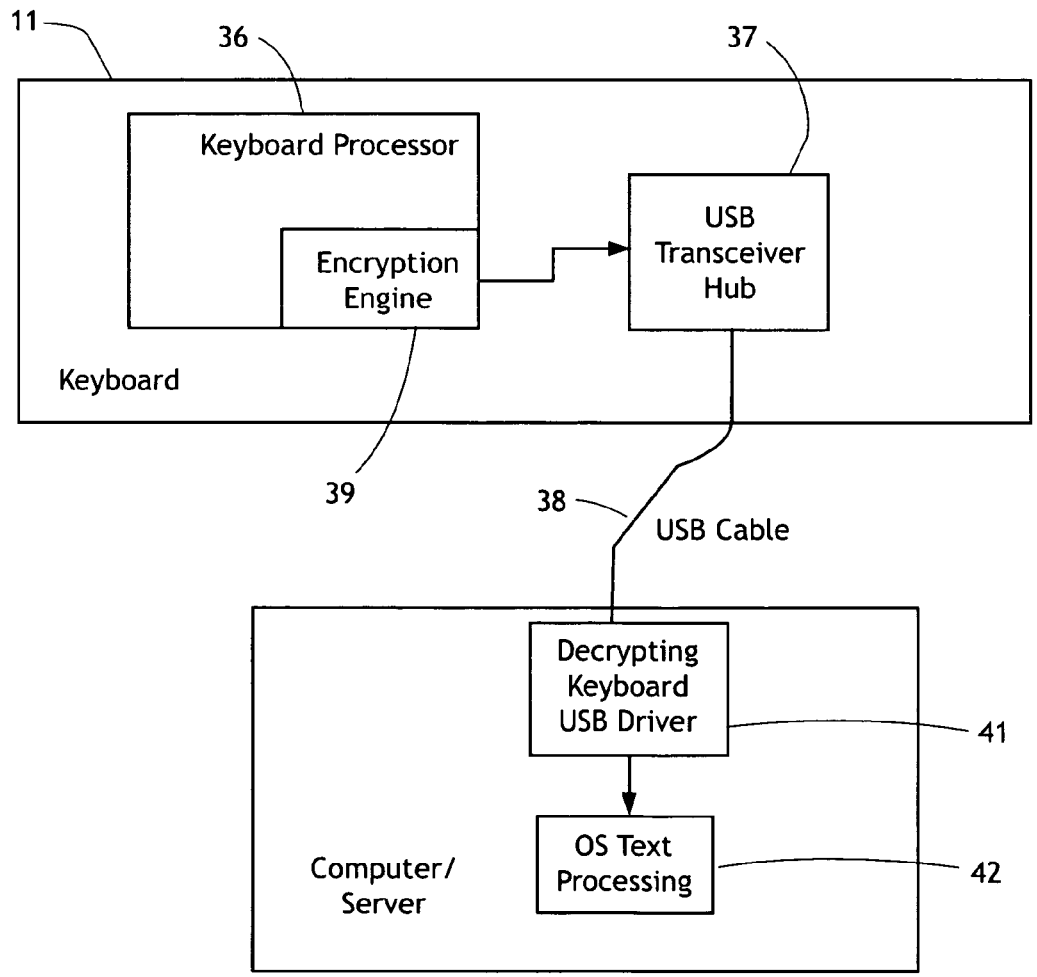
FIG. 4 is a block diagram flow chart depicting the operation of the keyboard of the invention together with a host computer.

With regard to FIG. 4, the keyboard 11 includes a keyboard processor 36 that communicates through a USB transceiver hub 37 and a USB cable 38 to the computer system or server. In one aspect of the invention, the keyboard processor 36 is used in part as an encryption engine 39 to encrypt the data transmitted from the keyboard to the computer/server. The computer/server is provided with a decrypting keyboard USB driver 41 to decipher the keystroke signals from the keyboard and transmit them to an OS text processing function of the computer/server. Thus all data sent from the keyboard to the computer/server is encrypted. This measure is employed to defeat the surreptitious use of a hardware keystroke logger, which may be added covertly to a keyboard to transmit every keystroke made by the user on the keyboard. Keystroke loggers are a serious threat to any system, since they can reveal confidential data and communications as well as username and password data. Keystroke loggers are very difficult to detect and defeat by software methods alone.

Note that the keyboard's native processor is used to carry out the encryption function, rather than a separate module. This saves hardware cost, takes advantage of the typically under-utilized processing power of the keyboard processor, and presents no extra module or other outward manifestation of the use of encryption for keystroke communication.

Figure 5:
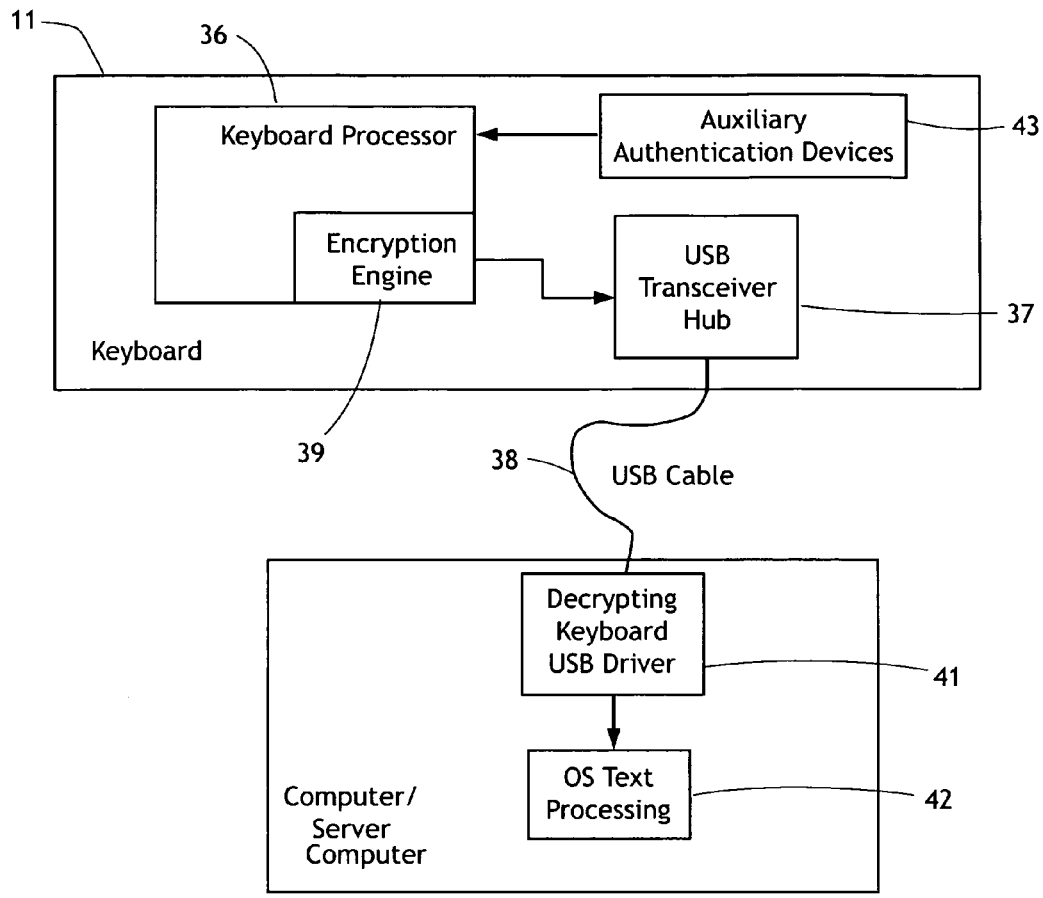
FIG. 5 is a block diagram as in FIG. 4, showing one embodiment in which an auxiliary authentication device provides two factor authentication.
Figure 6:
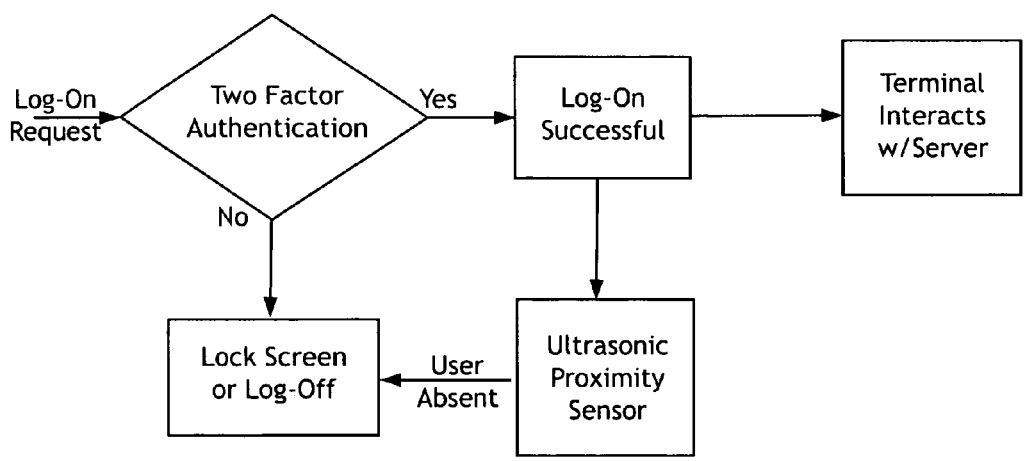
FIG. 6 is a block diagram flow chart depicting the operation of the combined TFA and UPD security access arrangement.

With regard to FIG. 5, a further aspect of the invention includes the components described in FIG. 4 which are accorded the same reference numerals. In addition, the keyboard 11 is provided with at least one and preferably two auxiliary authentication devices 43. These may include any of the devices 25 (RFID card reader, magnetic stripe reader, HID device, fingerprint sensor, etc.), the Bluetooth transceiver 25A, and the UPD 21 described previously. This arrangement enables the use of a log-in authentication scheme based on the presentation of two disparate factors. As shown in FIG. 6, the log-on process begins with a log-on request, which initiates the two factor authentication processes. These may include any two of the devices enumerated above; for example, an RFID card scan combined with a fingerprint scan. Many other combinations are possible. If the two authentications are successful, the terminal is connected to interact with the computer/server, and the user has access to the server through inputs to the keyboard. If the two authentication processes are not successful, the system will lock the screen and/or log-off the terminal from the computer/server.

When the log-on is successful, the ultrasonic proximity sensor 21 becomes significant, in that it monitors the area where a user would be located to access the keyboard. If, during a log-on condition, the ultrasonic proximity sensor emits a "user-absent" signal, the system reverts to the step of lock the screen and/or log-off. Thus the terminal is disconnected from the computer/server, in recognition of the fact that a log-on condition without the user's presence is an open invitation to access the otherwise secure system.

Given the fact that many available security devices 25 and 25A, such as magnetic strip readers, RFID readers, and the like communicate via a simple text channel. Unencrypted text can be read by a simple text editor and can be captured and read using a keystroke logger, as detailed above. However, in the present system the communications with the auxiliary authentication devices 43 (FIG. 5) is sent to the keyboard processor 36 and its encryption engine 39, whereby the security devices communicate in encoded signals that cannot be easily be deciphered.

In a preferred embodiment of the invention, the system relies on the Bluetooth transceiver 25A and the fingerprint scanner 25 for the two ID processes of the TFA system. When the user initially registers (sets up user access) with the system they bring with them any Bluetooth enabled device that they are likely to be carrying such as a cell phone, MP3 player, headset etc. At the same time master fingerprint templates are collected from the user. The Bluetooth devices serial numbers are collected and associated with the users fingerprint template in the authentication database.

When the user subsequently attempts to log in to the system, the user approaches the computer or terminal. The keyboard 11, using its embedded Bluetooth transceiver 25A, scans and becomes aware of the Bluetooth device(s) the user is carrying and discovers its unique serial number(s). The user places a finger on the fingerprint reader. The computer, using the fingerprint device use as a prompt, gathers all the serial numbers of every Bluetooth device within range, bundles the serial numbers and fingerprint data together and sends it through encryption engine 39 to the authorization server. The server queries the data to determine if the fingerprint data is associated with any of the acquired serial numbers. If so, the user is authorized and if not the user is rejected. This is a highly secure validation routine, resulting in a system that is not easily hacked.

Note that the user has nothing to remember, such as username or password, and nothing to carry, such as ID card or token generator, since the Bluetooth device (such as a cellphone or headset) associated with the fingerprint record is typically carried by the individual in any case. Also, the log-on procedure is very convenient: the user simply places their finger on the fingerprint reader and is either accepted, or rejected. There are no radio cards, token generating devices, software downloads and configurations required. All that is required is that the user be in possession of at least one of the Bluetooth devices that was previously registered by the system and a previously enrolled fingerprint scan.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. In a computer terminal that includes a keyboard connected to a computer through a communications channel, subject to a user log-on authentication process, the improvement comprising:

at least one user identification module secured within and connected to the keyboard, each identification module capable of carrying out a respective log-on user authentication process;

a user presence detector supported on an upper surface of the keyboard and directed toward an expected location of a user at the keyboard, said user presence detector generating a user-absent signal when no user is detected at said expected location; and, said computer terminating the connection of the terminal to the computer following a predetermined time delay after said user-absent signal is received;

wherein said user presence detector means includes an ultrasonic presence detector that projects an acoustic beam primarily along a detector axis.

2. The improved terminal of claim 1, wherein the keyboard includes encryption engine means for encrypting all communications between the keyboard and the computer, including communications from said at least one user identification module and said user presence detector means.

3. The improved terminal of claim 2, wherein the keyboard includes an internal keyboard microprocessor, and said encryption engine means resides in said microprocessor.

4. The improved terminal of claim 1, wherein the keyboard has a rectangular plan layout with an upper surface and a corner area adjacent one vertex thereof, and said ultrasonic presence detector includes a housing projecting upwardly from said upper surface in said corner area.

5. The improved terminal of claim 4, wherein said detector axis extends at approximately a 20° elevation above a horizontal surface supporting the keyboard.

6. The improved terminal of claim 5, wherein said detector axis extends at approximately a 35° angle with an axis that bisects upper and lower edges of the keyboard.

7. The improved terminal of claim 1, wherein said at least one user identification module is selected from a group that includes: RFID card reader, Bluetooth transceiver, electromagnetic card stripe reader, fingerprint scanner, and HID device.

8. The improved terminal of claim 1, further including a pair of said user identification modules, whereby the keyboard carries out a two factor log-on authentication process with said modules.

9. The improved terminal of claim 8, wherein said pair of user identification modules includes a Bluetooth transceiver and a fingerprint sensor.

10. The improved terminal of claim 9, further including a record stored in the computer that combines the identification numbers of a user's personal electronic devices that are Bluetooth enabled, and also a fingerprint scan image, the computer enabling log-on when a log-on request matches the Bluetooth identification and the fingerprint scan of said computer record.

11. The improved terminal of claim 1, further including means for recognizing said keyboard and said at least one user identification module and comparing them to a record in the computer that lists all devices connected to said terminal, and activating said means for terminating the connection of the terminal to the computer when said keyboard and said at least one user identification module do not match the record that lists all devices at the terminal.

12. The improved terminal of claim 1, further including a software application in the computer that detects the existence of said ultrasonic presence detector at the terminal and, if not detected, activates said means for terminating the connection of the terminal to the computer.

13. The improved terminal of claim 1, further including a software application in the computer that blocks any log-on from the terminal unless said ultrasonic presence detector is connected to the terminal.

\* \* \* \* \*